US012653143B2

(12) United States Patent
Arroyave Gómez et al.

(10) Patent No.: US 12,653,143 B2
(45) Date of Patent: Jun. 16, 2026

(54) SANITARY SAND COMPOSITION COMPRISING CORN AND METHOD FOR ITS PREPARATION

(71) Applicant: TECNINSUMOS LIMITADA, Medellin (CO)

(72) Inventors: Andrés Felipe Arroyave Gómez, Medellin (CO); Alberto Arroyave Henao, Medellin (CO)

(73) Assignee: TECNINSUMOS LIMITADA, Medellin (CO)

( * ) Notice: Subject to any disclaimer, the term of this patent is extended or adjusted under 35 U.S.C. 154(b) by 0 days.

(21) Appl. No.: 18/389,531

(22) Filed: Nov. 14, 2023

(65) Prior Publication Data

US 2024/0156047 A1 May 16, 2024

(30) Foreign Application Priority Data

Nov. 16, 2022 (CO) ......................... NC2022/0016461

(51) Int. Cl.
A01K 1/015 (2006.01)

(52) U.S. Cl.
CPC .................................. A01K 1/0155 (2013.01)

(58) Field of Classification Search
None
See application file for complete search history.

(56) References Cited

U.S. PATENT DOCUMENTS

| 6,371,049 B1 * | 4/2002 | Boden .................. A01K 1/0154 |
| | | 119/171 |
| 7,089,882 B1 * | 8/2006 | Tsengas ............... A01K 1/0155 |
| | | 119/172 |
| 9,185,878 B2 * | 11/2015 | Kuras .................. A01K 1/0107 |
| 9,232,767 B2 * | 1/2016 | Wang ................... A01K 1/0154 |
| 2004/0025798 A1 * | 2/2004 | Lee ....................... A01K 1/0154 |
| | | 119/172 |
| 2007/0012259 A1 * | 1/2007 | Ellis ..................... A01K 1/0155 |
| | | 119/526 |
| 2008/0050273 A1 | 2/2008 | Agblevor |

(Continued)

FOREIGN PATENT DOCUMENTS

| CN | 111498920 A | 8/2020 | |
| WO | WO-2018226804 A1 * | 12/2018 | ............. C04B 20/10 |

OTHER PUBLICATIONS

Systems and methods for manufacturing granules (Year: 2018).*

*Primary Examiner* — Kimberly S Berona
*Assistant Examiner* — Nevena Aleksic
(74) *Attorney, Agent, or Firm* — Resonance IP Law, PC

(57) ABSTRACT

The present invention relates to a new corn-based sanitary sand and its manufacturing method. The sanitary sand ensures excellent absorption and clumping of fluids, is fully biodegradable, does not produce dust or sludge, and does not cause dermatitis or dryness on cats' paws. The corn-based sanitary sand comprises corn in a proportion of between 77 to 97%, mineral salt in a proportion between 1 to 15%, preservatives such as calcium propionate, sorbic acid, potassium sorbate in a proportion between 0.0075 and 0.04% w/w, odor inhibitors in a proportion between 0.075 and 1.25% w/w, and fragrance in a proportion between 0.3 and 0.6% w/w. In another aspect, the patent application refers to the manufacturing method of the sand.

15 Claims, 10 Drawing Sheets

(56)                    References Cited

U.S. PATENT DOCUMENTS

2008/0223302 A1*  9/2008  Wang ................... A01K 1/0155
                                                        502/80
2012/0288468 A1*  11/2012  Wang ................... A01K 1/0155
                                                        424/76.6
2017/0035021 A1      2/2017  Kent
2024/0107975 A1*  4/2024  Gandikota ........... A01K 1/0155

* cited by examiner

SANITARY SAND COMPOSITION COMPRISING CORN AND METHOD FOR ITS PREPARATION

FIELD OF THE INVENTION

The present invention pertains to the technical field of cat litters, more specifically to a corn-based cat litter and its preparation method.

PRIOR ART

In the prior art, various clumping compositions, specifically organic cat litters, biodegradable and suitable for disposal in sewer systems after use, have been described.

Patent application US2004069237A1 discloses an animal litter that includes seed flour. According to the invention, the animal litter comprises multiple discrete particles of seed flour, which tend to clump when moistened. The litter of the invention absorbs liquids such as animal excrement and substantially reduces its odor. Preferably, the litter also includes a grain germ, such as corn germ.

On the other hand, patent application CN111498920A describes an explosive deodorizing bead, a deodorized cat litter, and a method for manufacturing the same. The deodorizing bead comprises a rubber skin and an enveloping liquid, and the compression resistance of the deodorizing bead is 0.4-1 Pa. The rubber skin comprises konjac glucomannan or guar gum or agar or carrageenan or xanthan gum or similar substances, and the explosive deodorizing bead is applied to the deodorizing animal litter. After encountering urine, the explosive bead breaks, releasing the liquid for deodorization, and the effect is good. By controlling the pressure resistance of the explosive bead, it breaks when it encounters urine, dissolves, and absorbs urine in 15-20 seconds, achieving the deodorization effect. It cannot break during the transportation process, ensuring the product quality is unaffected.

U.S. Pat. No. 11,013,211B2 provides a method for making an extruded granular absorbent. The method includes providing an extruder and a mixture containing starch, pressurizing the starch-containing mixture in the extruder under relatively high extrusion pressures to extrude the pressurized starch-containing mixture from the extruder, and producing an extruded water-absorbent and oil-absorbent. Furthermore, the extruded granular absorbent can be combined with non-extruded granular material with a relatively high content of inert or cellulose, where there may be a higher proportion of extruded granular absorbent, and the extruded granular absorbent and the non-extruded granular material agglomerate to form a clump when moistened with water or urine.

SUMMARY OF THE INVENTION

The inventors of the present patent application have identified a need in the technical field of corn-based cat litters that meet the desired quality characteristics. Specifically, they recognized the need for cat litters that ensure excellent absorption and clumping of fluids, are completely biodegradable, do not generate dust or sludge, and do not cause dermatitis or dryness in the paws of cats.

To address this need, the inventors have developed a corn-based cat litter and its manufacturing method. The cat litter comprises corn in an amount between 77 and 97% w/w, mineral salt in an amount between 1 and 15% w/w, preservatives in an amount between 0.0075 and 0.04% w/w, odor inhibitors in an amount between 0.075 and 1.25% w/w, and fragrance in an amount between 0.3 and 0.6% w/w.

In another aspect, the present application refers to the manufacturing method of the cat litter, which includes the steps of: cleaning whole corn; grinding the corn; contacting the ground corn with supersaturated steam under constant movement; passing the product obtained in the previous step through an expander by heating it through friction and adding steam; allowing the pressure to which the product obtained in the previous step is subjected to decrease to atmospheric pressure upon exiting the expander; cutting the product obtained in the previous step; cooling the cut solid product; grinding the cooled product; mixing the cooled and ground product, along with a first portion of mineral salt, preservatives, odor inhibitors, and fragrance, obtaining a first premix; separately mixing the remaining portion of mineral salt, along with a coloring agent, obtaining a second premix; and combining the first and second premixes.

Throughout the specification and claims, the term "comprises" and its variations do not intend to exclude other technical features, additives, components, or steps. Furthermore, the term "comprises" includes the case "consists of." For those skilled in the art, other objects, advantages, and features of the invention will partly arise from the description and partly from the practice of the invention. The following examples and drawings are provided for illustrative purposes and are not intended to be limiting of the present invention. Moreover, the present invention covers all possible combinations of particular and preferred embodiments disclosed herein.

DETAILED DESCRIPTION OF THE INVENTION

Figure 1:
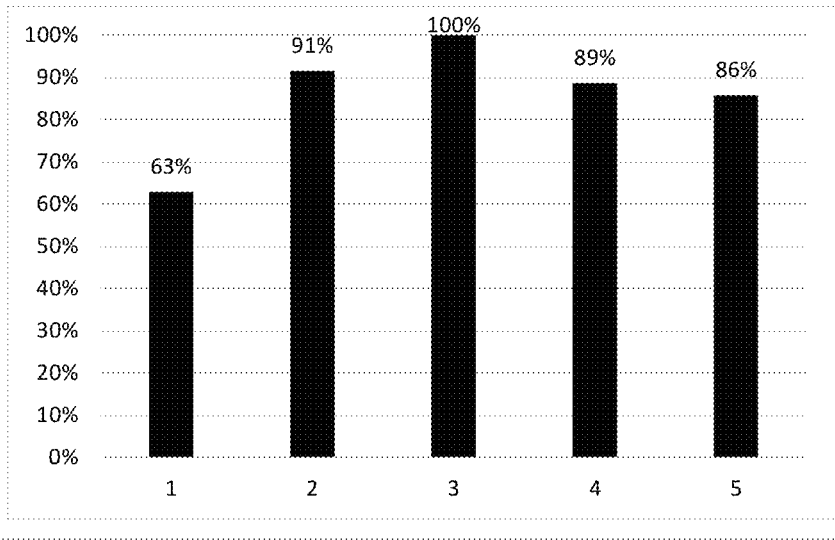
FIG. 1 depicts the graph of results from samples processed by an expander for Example 1.
Figure 1:
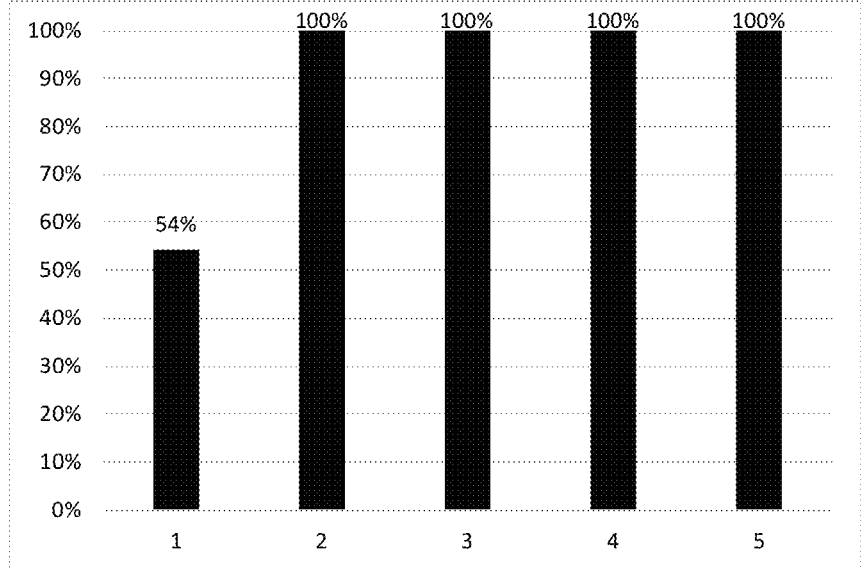

In a first aspect, the present invention relates to a composition of sanitary sand comprising corn in a proportion ranging from 77 to 97% w/w, mineral salt in a proportion ranging from 1 to 15% w/w, preservatives in a proportion between 0.0075 and 0.04% w/w, odor inhibitors in a proportion ranging from 0.075 to 1.25% w/w, and fragrance in a proportion ranging from 0.3 to 0.6% w/w.

Mineral salts are inorganic compounds formed by anions and cations that can be classified as acids. In one embodiment of the invention, mineral salts are selected from the group consisting of sodium chloride and zinc chloride.

In a specific embodiment of the invention, mineral salts are specifically sodium chloride and, more specifically, can be sea salt.

Mineral salts create impermeability in the sand, which, in the proper proportion, prevents the liquid or bodily fluids of the cat or any other animal from reaching the bottom of the container (litter box), which is one of the main causes of bad odor and inadequate clumping.

Additionally, the inventors have unexpectedly found that mineral salts prevent a change in the color of the sand.

In one embodiment of the invention, preservatives are selected from the group consisting of calcium propionate, sorbic acid, potassium sorbate, or mixtures thereof.

In one embodiment of the invention, odor inhibitors can be essential oils such as, but not limited to, lavender, mint, geranium, cedarwood, cypress, lemon, eucalyptus, tea tree oil, mixtures thereof, among others.

In another embodiment of the invention, the litter composition further comprises plant-based fibers in a proportion of between 2 to 20% w/w. Plant-based fibers are selected from the group consisting of rice hulls, corn bran, rice bran, wheat bran, cassava bran, *Yucca shirigera*, or mixtures thereof.

In one embodiment of the invention, the litter composition further comprises other micro-ingredients in a proportion of between 0.075 and 6.25% w/w. The other micro-ingredients are selected from the group consisting of citric acid, chlorine dioxide, sodium percarbonate, silicon dioxide, glycerin, mineral oil, active oxygen, and mixtures thereof.

In another embodiment of the invention, the litter composition additionally comprises a pH stabilizer in a proportion of between 4 and 18% w/w.

In an embodiment of the invention, the pH stabilizer is selected from the group consisting of calcium carbonate, sodium bicarbonate, and potassium hydroxide.

In another embodiment of the invention, the litter composition may further comprise a dye in a proportion of between 0.001 to 0.05% w/w. The dye can be a lacquer or water-insoluble dye.

In another embodiment of the invention, the litter composition may further comprise an acidity regulator in a proportion of 0.05 to 3% w/w.

In an embodiment of the invention, the acidity regulator can be silicon dioxide.

In another embodiment of the invention, the composition also includes enzymes selected from the group consisting of amylase, protease, and lipase, in a proportion of between 0.01 to 0.1% w/w. Enzymes complement the odor inhibiting action since they denature fats in the case of lipase, proteins through protease, and starches that come into contact with water through amylase.

In a second aspect, the present invention is directed to a method of preparing the sanitary sand composition comprising the steps of: cleaning the whole corn; grinding the corn; contacting the ground corn with supersaturated steam under constant movement; passing the product obtained in the previous step through an expander, heating it by friction, and adding steam; allowing the pressure to which the product obtained in the previous step is subjected to decrease to atmospheric pressure upon exiting the expander; cutting the product obtained in the previous step; cooling the cut solid product; grinding the cooled product; mixing the cooled and ground product, together with a first portion of mineral salt, preservatives, odor inhibitors, and fragrance, obtaining a first premix; separately mixing the remaining portion of mineral salt, together with a dye, obtaining a second premix; and mixing the first and second premix.

Corn cleaning can be carried out in a cyclone conveyor system to remove foreign objects, soil, and impurities. Once the corn is cleaned, it is ground to a particle size of at least 60 mesh (U.S. mesh) or finer.

In an embodiment of the method of the invention, the ground corn is brought into contact with supersaturated steam in a conditioner-type reactor.

In another embodiment of the method of the invention, the ground corn is brought into contact with supersaturated steam at a pressure between 3447 and 137895 Pa, at a temperature between 100 and 180° C., and for 5 to 30 seconds.

Once the corn is conditioned, it can be passed through an expander, heating it by friction and adding steam.

In one embodiment of the method of the invention, the expander operates at 1600 rpm.

In another embodiment of the method of the invention, in the expander, steam is injected into the product at a pressure between 465396 and 775660 Pa, and at a temperature between 120 and 170° C.

In one embodiment of the method of the invention, the product obtained in step e is cut, with a diameter of 10 to 25 mm and a thickness of 0.1 to 5 mm.

In another embodiment of the method of the invention, the mixture is cooled in a drum-cyclone system at an angular velocity of 37.7 rad/s.

In one embodiment of the method of the invention, after grinding the mixture, it is passed through a sieve, which can be 7 mm.

In another embodiment of the method of the invention, to obtain the first premix, the following steps are carried out: i) adding a first portion of the mixed and ground product to a mixer; ii) adding a first portion of mineral salt over the mixed and ground product, forming a uniform layer; iii) adding odor inhibitors and fragrance without mixing them, over the layer of mineral salt; iv) adding preservatives and the remaining portion of the mixed and ground product until the total weight of the mixture doubles the weight of the first portion of the mixed and ground product; v) continuously mixing for 5 to 15 minutes, obtaining the first premix.

In an embodiment of the method of the invention, to obtain the second premix, the following steps are carried out: i) adding the remaining portion of mineral salt to a mixer; ii) adding the dye; iii) continuously mixing for 5 to 15 minutes.

In another embodiment of the method of the invention, the first and second premixes are mixed in a mixer for 5 to 15 minutes continuously.

In an embodiment of the method of the invention, corn is added in an amount of between 77 to 97% w/w of the total mixture, mineral salt in an amount of between 1 to 15% w/w of the total mixture, preservatives in an amount between 0.0075 and 0.04% w/w of the total mixture, odor inhibitors in an amount of between 0.075 and 0.125% w/w of the total mixture, and fragrance in an amount of between 0.3 and 0.6% w/w of the total mixture.

In another embodiment of the method of the invention, plant-based fibers are also added in an amount of between 2 to 20% w/w of the total mixture, in step a), along with the whole corn.

In an embodiment of the method of the invention, to obtain the first premix, the method further comprises adding, along with the preservatives, other micro-ingredients in an amount of between 0.075 and 6.25% w/w of the total mixture.

In another embodiment of the method of the invention, to obtain the first premix, the method further comprises adding, along with the preservatives, calcium carbonate in an amount of between 4 and 18% w/w of the total mixture.

In an embodiment of the method of the invention, to obtain the second premix, a dye is added in an amount of between 0.001 to 0.05% w/w.

In another embodiment of the method of the invention, to obtain the second premix, enzymes are added in an amount of between 0.01 to 0.1% w/w.

In an embodiment of the method of the invention, the enzymes are selected from the group consisting of amylase, protease, and lipase.

In an embodiment of the method of the invention, to obtain the second premix, an acidity regulator is added in an amount of 0.05 to 3% w/w of the total mixture.

In an embodiment of the invention, the acidity regulator is silicon dioxide.

For the purposes of this application, an "extruder" is a thermo-baric equipment with a short shaft with continuous conveyors, with washers that obstruct the passage and generate high friction. The heat generated due to friction increases drastically.

On the other hand, an "expander" is also a thermo-baric equipment but has a long shaft with conveyors "interrupted" by some pins, generating low friction. Steam is injected to drastically increase pressure, humidity, and heat.

Although both pieces of equipment are similar in being thermo-baric equipment, they differ in how heat is transferred, and therefore, in the results obtained with each one. The following seeks to demonstrate that the expander used in the method of the present invention allows beneficial transformation of corn for sanitary sand, turning it into a substrate with better characteristics compared to what exists in the prior art.

It is also sought to demonstrate that the formulations protected by the present invention have unexpected and surprising technical effects that give a technical advantage to the invention over the prior art.

Four comparative tests were carried out between sanitary sand produced in an extruder machine and in an expander, with different formulations and under different conditions. To carry out the tests in a comparative manner, the flow, temperature, and added humidity parameters were set the same in both the extruder and the expander as follows: Flow: 0.00028 m3/s; Temperature: 130° C., and Added humidity: 16.67 cm3/s. The sands obtained using the expander were obtained using the methods described above and meet the characteristics of the compositions previously described.

Example 1

Five samples of 200 g each were prepared with corn processed by an expander, following the steps of the method of the present invention, with five different compositions, named sample 1 to sample 5, and five samples of 200 g each with corn processed by an extruder, with five different compositions, named sample 6 to sample 10.

The samples obtained by the expander and containing mineral salt were prepared according to the following method: the whole corn was cleaned; the corn was ground; the ground corn was brought into contact with supersaturated steam under constant movement; the product obtained in the previous step was passed through an expander, heating it by friction and adding steam; the pressure to which the product obtained in the previous step was subjected was allowed to decrease to atmospheric pressure upon exiting the expander; the product obtained in the previous step was cut; the solid cut product was cooled; the cooled and ground product was ground; the cooled and ground product was mixed, along with a first portion of mineral salt, preservatives, odor inhibitors, and fragrance, obtaining a first premix; the remaining portion of mineral salt, along with a dye, was mixed separately, obtaining a second premix; and the first and second premix were mixed.

The samples made with an expander that did not have salt were obtained using the same method but without adding this component in the corresponding stages.

The corn was cleaned in a cyclone conveyor system to eliminate foreign objects, dirt, and impurities. Once the corn was clean, it was ground to a particle size of at least 60 mesh (U.S. mesh) or finer. The ground corn was brought into contact with supersaturated steam under constant movement in a conditioner-type reactor, at a pressure of between 3447 and 137895 Pa, and at a temperature of between 100 and 180° C., for 5 to 30 seconds. Once the corn was conditioned, it was passed through an expander, heating it by friction and adding steam. The expander operated at 1600 rpm. In the expander, steam was injected into the product at a pressure of between 465396 and 775660 Pa, and at a temperature of between 120 and 170° C. In the cutting step, the product was cut with blades rotating between 500 and 2000 rpm to obtain a diameter between 10 and 25 mm and a thickness between 0.1 and 5 mm. The mixture was cooled in a drum-cyclone system at an angular velocity of 37.7 rad/s. After grinding the mixture for the second time, it was passed through a 7 mm sieve.

To obtain the first premix, the following steps were carried out: a first portion of the mixed and ground product was added to a mixer; a first portion of the mineral salt was added on top of the mixed and ground product, forming a uniform layer; odor inhibitors and fragrance were added without being mixed, over the layer of mineral salt; preservatives and the remaining portion of the mixed and ground product were added until the total weight of the mixture was twice the weight of the first portion of the mixed and ground product; continuous mixing was carried out for 5 to 15 minutes, obtaining the first premix.

To obtain the second premix, the following steps were carried out: the remaining portion of mineral salt was added to a mixer; the dye was added; and continuous mixing was carried out for 5 to 15 minutes.

The first and second premix were mixed in a mixer for 5 to 15 minutes continuously.

To obtain the second premix, pirosil (silicon dioxide) was also added in some samples as an acidity regulator.

10 g of sewage emitting a foul odor were added to each sample. The samples were evaluated every 4 hours for 24 hours. The samples were stored in a well-ventilated 13 m³ room. The evaluation considered the opinion of five adults. The results of the individuals in each iteration were weighted with rounding up.

Table 1 below describes the formulation of each of the samples processed by the expander:

TABLE 1

Formulation of samples processed by the expander.

| Ingredient | Sample 1 | Sample 2 | Sample 3 | Sample 4 | Sample 5 |
|---|---|---|---|---|---|
| Corn | 99.83% w/w | 96.08% w/w | 95.98% w/w | 94.73% w/w | 89.73% w/w |
| Sodium chloride | 0.00% w/w | 3.75% w/w | 3.75% w/w | 5.00% w/w | 10.00% w/w |
| Odor inhibitor (essential oil blend) | 0.10% w/w | 0.10% w/w | 0.10% w/w | 0.10% w/w | 0.10% w/w |
| Lemon-mint fragrance | 0.05% w/w | 0.05% w/w | 0.05% w/w | 0.05% w/w | 0.05% w/w |
| Sorbic acid | 0.01% w/w | 0.01% w/w | 0.01% w/w | 0.01% w/w | 0.01% w/w |
| Potassium sorbate | 0.01% w/w | 0.01% w/w | 0.01% w/w | 0.01% w/w | 0.01% w/w |
| Pirosil (silicon dioxide) | 0.00% w/w | 0.00% w/w | 0.10% w/w | 0.10% w/w | 0.10% w/w |

In Table 2 below, the formulation of each of the samples processed by the extruder is described:

TABLE 2

Formulation of each of the samples processed by the extruder.

| Ingredient | Sample 6 | Sample 7 | Sample 8 | Sample 9 | Sample 10 |
|---|---|---|---|---|---|
| Corn | 99.83% w/w | 96.08% w/w | 95.98% w/w | 94.73% w/w | 89.73% w/w |
| Sodium chloride | 0.00% w/w | 3.75% w/w | 3.75% w/w | 5.00% w/w | 10.00% w/w |
| Odor inhibitor (essential oil blend) | 0.10% w/w | 0.10% w/w | 0.10% w/w | 0.10% w/w | 0.10% w/w |
| Lemon-mint fragrance | 0.05% w/w | 0.05% w/w | 0.05% w/w | 0.05% w/w | 0.05% w/w |
| Sorbic acid | 0.01% w/w | 0.01% w/w | 0.01% w/w | 0.01% w/w | 0.01% w/w |
| Potassium sorbate | 0.01% w/w | 0.01% w/w | 0.01% w/w | 0.01% w/w | 0.01% w/w |
| Pirosil (silicon dioxide) | 0.00% w/w | 0.00% w/w | 0.10% w/w | 0.10% w/w | 0.10% w/w |

In Table 3 below, the results of each of the samples processed by the expander are described. Additionally, the results can be seen in the graph in FIG. 1.

TABLE 3

Results of samples processed by expander for Example 1

| | Odor Evaluation | | | | |
| Elapsed Time | On a scale from 1 to 5; 5 being pleasant and 1 unpleasant | | | | |
| | | | Sample Number | | |
| [Hours] | 1 | 2 | 3 | 4 | 5 |
|---|---|---|---|---|---|
| 0 | 4 | 5 | 5 | 5 | 5 |
| 4 | 3 | 5 | 5 | 5 | 5 |
| 8 | 3 | 5 | 5 | 5 | 4 |
| 12 | 3 | 5 | 5 | 4 | 4 |
| 16 | 3 | 4 | 5 | 4 | 4 |
| 20 | 3 | 4 | 5 | 4 | 4 |
| 24 | 3 | 4 | 5 | 4 | 4 |
| Total | 63% | 91% | 100% | 89% | 86% |

| | Color Evaluation | | | | |
| Elapsed Time | On a scale from 1 to 5; 5 no change and 1 significant change | | | | |
| | | | Sample Number | | |
| [Hours] | 1 | 2 | 3 | 4 | 5 |
|---|---|---|---|---|---|
| 0 | 5 | 5 | 5 | 5 | 5 |
| 4 | 5 | 5 | 5 | 5 | 5 |
| 8 | 4 | 5 | 5 | 5 | 5 |
| 12 | 2 | 5 | 5 | 5 | 5 |
| 16 | 1 | 5 | 5 | 5 | 5 |
| 20 | 1 | 5 | 5 | 5 | 5 |
| 24 | 1 | 5 | 5 | 5 | 5 |
| Total | 54% | 100% | 100% | 100% | 100% |

Figure 2:
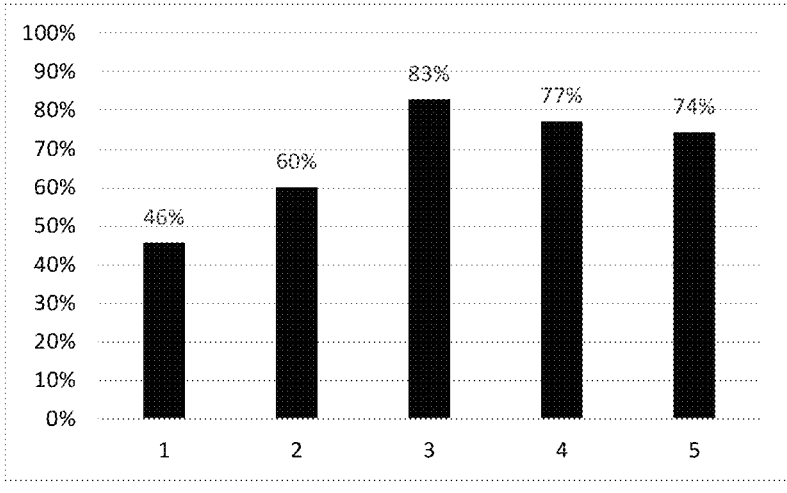
FIG. 2 illustrates the graph of results from samples processed by an extruder for Example 1.
Figure 2:
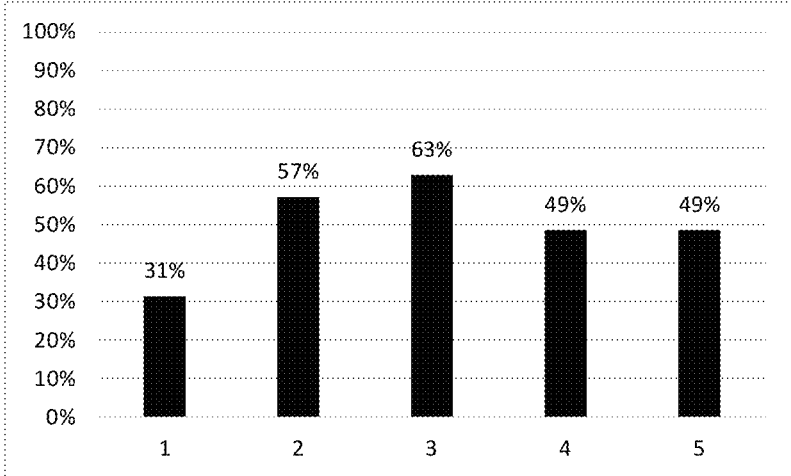

The results of each of the samples processed by the extruder are described in Table 4 below. Likewise, the results can be seen in the graph in FIG. 2.

TABLE 4

Results of samples processed by the extruder for Example 1.

| | Odor Evaluation | | | | |
| Elapsed Time | On a scale from 1 to 5; 5 being pleasant and 1 unpleasant | | | | |
| | | | Sample Number | | |
| [Hours] | 1 | 2 | 3 | 4 | 5 |
|---|---|---|---|---|---|
| 0 | 4 | 5 | 5 | 5 | 5 |
| 4 | 2 | 4 | 5 | 5 | 4 |
| 8 | 2 | 3 | 5 | 4 | 4 |
| 12 | 2 | 3 | 4 | 4 | 4 |
| 16 | 2 | 2 | 4 | 3 | 3 |
| 20 | 2 | 2 | 3 | 3 | 3 |
| 24 | 2 | 2 | 3 | 3 | 3 |
| Total | 46% | 60% | 83% | 77% | 74% |

| | Color Evaluation | | | | |
| Elapsed Time | On a scale from 1 to 5; 5 no change and 1 significant change | | | | |
| | | | Sample Number | | |
| [Hours] | 1 | 2 | 3 | 4 | 5 |
|---|---|---|---|---|---|
| 0 | 5 | 5 | 5 | 5 | 5 |
| 4 | 1 | 3 | 3 | 3 | 3 |
| 8 | 1 | 3 | 3 | 3 | 3 |
| 12 | 1 | 3 | 3 | 3 | 3 |
| 16 | 1 | 2 | 3 | 1 | 1 |
| 20 | 1 | 2 | 3 | 1 | 1 |
| 24 | 1 | 2 | 2 | 1 | 1 |
| Total | 31% | 57% | 63% | 49% | 49% |

In all cases, the samples without sodium chloride (sea salt) in their composition underwent a sudden color change, with the appearance of black spots. This is an undesirable effect and a potential health risk factor for the animal, as it indicates mycotoxins and/or agents affecting the product's quality. This demonstrates that the use of a mineral salt in the composition has a beneficial effect on maintaining the color of the litter.

In the 5 samples of corn processed by the extruder, a dark color change is evident (samples 6 to 10), while in 4 of the 5 samples of corn processed by the expander, no color change is observed (samples 2 to 5). This is an unexpected discovery since corn processed by the expander and sea salt clearly shows that sea salt prevents a color change in cat litter, in proportions between 3.75% and 10%.

In all samples of corn processed by the expander (samples 1 to 5), better odor control is evident than in all samples of corn processed by the extruder (samples 6 to 10). This demonstrates that the expander treatment significantly improves the inhibitory capacity of bad odors for use as cat litter.

It is important to note that the difference between sample 2 and 3 (and their equivalents with the extruder samples 7 and 8) is the silica dioxide, and experimental results indicate an improvement in odor and color control.

On the other hand, it should be noted that, when carrying out the method for the preparation of the litter, to obtain the second premix, silica dioxide is mixed with sodium chloride in such a way that the silica dioxide adheres to the surface of sodium chloride. The inventors have thus discovered that, in these types of compositions, sodium chloride has a highly hygroscopic action and tends to absorb moisture present in the environment, thereby altering its properties and eventually contributing moisture to its surroundings.

By ensuring that the silica dioxide adheres to the surface of sodium chloride, it is achieved that silica dioxide, and not sodium chloride, absorbs ambient moisture without altering the properties of the environment. According to the tests conducted, an amount of 0.1% w/w of silica dioxide is sufficient to inhibit moisture absorption from a litter containing up to 10% w/w of mineral salt.

Therefore, it has unexpectedly been found that there is a strong correlation of corn-mineral salt-silica dioxide that significantly affects the performance, behavior, and lifespan of cat litter in a positive way. However, litter compositions comprising corn-mineral salt, without silica dioxide, also exhibit advantageous characteristics regarding litter color, as explained above.

Regarding the use of preservatives, considering that corn litter is susceptible to being accidentally ingested by pets, the added percentage does not exceed about 0.01% w/w for calcium propionate and sorbic acid, in order not to affect the health of the animals. The intention of adding these components is to provide a protective barrier against fungi, molds, and yeasts in the litter.

The proportion of essential oils leaves a persistent residual odor over time, used as a complement to the litter's odor elimination capacity to deter any lingering odors that may occur in the normal use of the litter. As in the previous case, no more than about 0.1% w/w was added to avoid rejection by cats due to their sensitivity to odors.

Example 2

In beakers, 6 samples of 200 ml of cat litter were placed, each with different characteristics, as shown in Table 5 below. Then, water began to be added to each of the samples until saturation point, i.e., until they no longer absorbed more water and a supernatant remained. For each sample, the amount of water absorbed up to the saturation point was weighed, and the characteristics of each case were observed.

TABLE 5

Formulation of each of the samples processed for Example 2.

| Ingrediente | Sample 1 | Sample 2 | Sample 3 | Sample 4 | Sample 5 | Sample 6 |
|---|---|---|---|---|---|---|
| Corn | 99.83% w/w | 94.83% w/w | 89.83% w/w | 99.83% w/w | 94.83% w/w | 89.83% w/w |
| Sodium chloride | 0.00% w/w | 5% w/w | 10% w/w | 0.00% w/w | 5% w/w | 10% w/w |
| Odor inhibitor (essential oil blend) | 0.10% w/w | 0.10% w/w | 0.10% w/w | 0.10% w/w | 0.10% w/w | 0.10% w/w |
| Lemon-mint fragrance | 0.05% w/w | 0.05% w/w | 0.05% w/w | 0.05% w/w | 0.05% w/w | 0.05% w/w |
| Sorbic acid | 0.01% w/w | 0.01% w/w | 0.01% w/w | 0.01% w/w | 0.01% w/w | 0.01% w/w |
| Potassium sorbate | 0.01% w/w | 0.01% w/w | 0.01% w/w | 0.01% w/w | 0.01% w/w | 0.01% w/w |
| Pirosil (silicon dioxide) | 0.00% w/w | 0.00% w/w | 0.00% w/w | 0.00% w/w | 0.00% w/w | 0.00% w/w |

The results were measured and presented according to the following variables:

Initial Weight: It is the weight, measured in grams, of each 200 ml sample (basis of the test).

Amount of Absorbed Water: Weight, measured in grams, of the water that each sample absorbed completely (up to saturation).

Wet Litter Quantity: The amount of litter that remained wet after the absorption of water. It was removed and weighed.

Dry Litter Quantity: The amount of litter that remained dry after the absorption of water. It was removed by discarding from the container and subsequently weighed.

Final Weight: It was the total final weight of the litter after the tests. This includes the initial weight plus the weight of the absorbed water.

Figure 3:
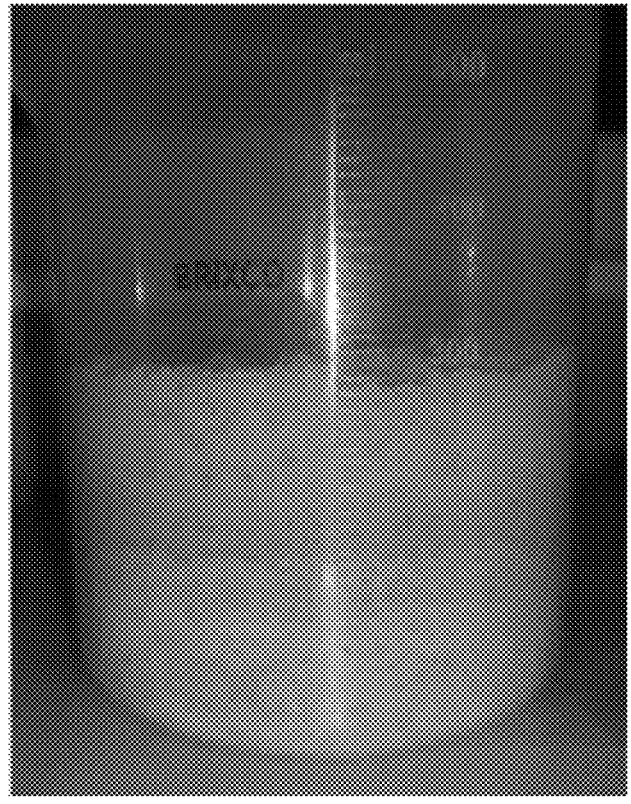
FIG. 3 presents a reference image for determining the average height in Example 2.
Figure 4:
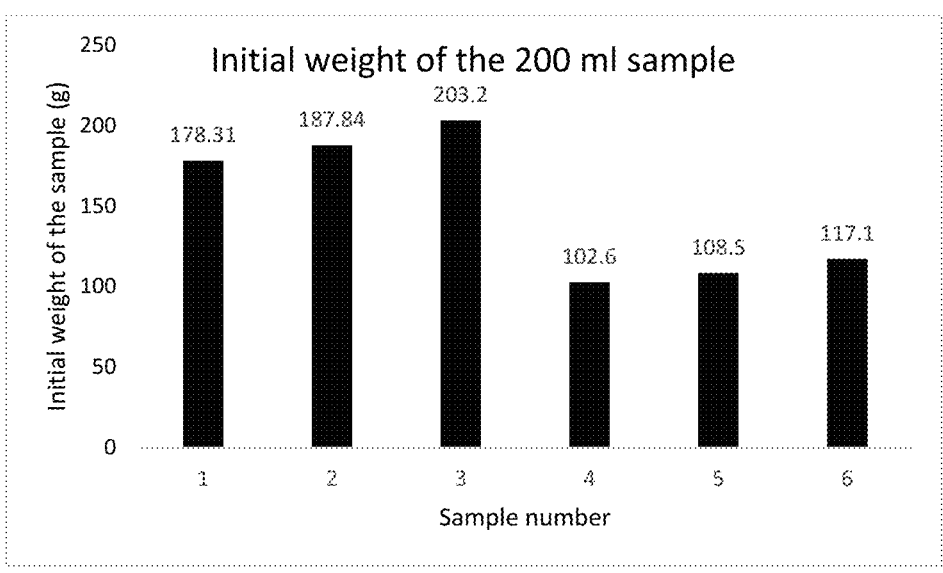
FIG. 4 displays the graph of the results of initial weight of the samples of Example 2.
Figure 5:
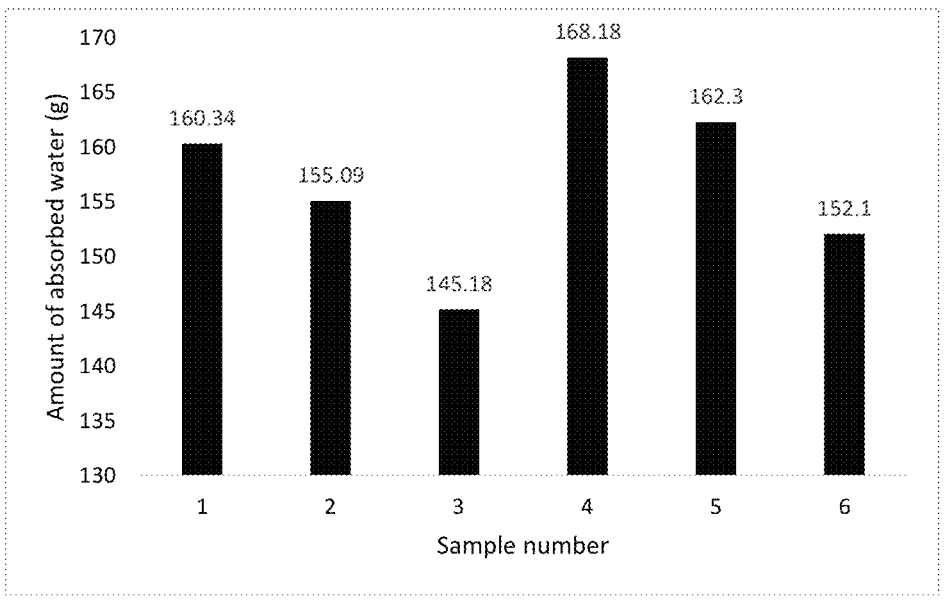
FIG. 5 exhibits the graph of the results of amount of absorbed water by the samples of Example 2.
Figure 6:
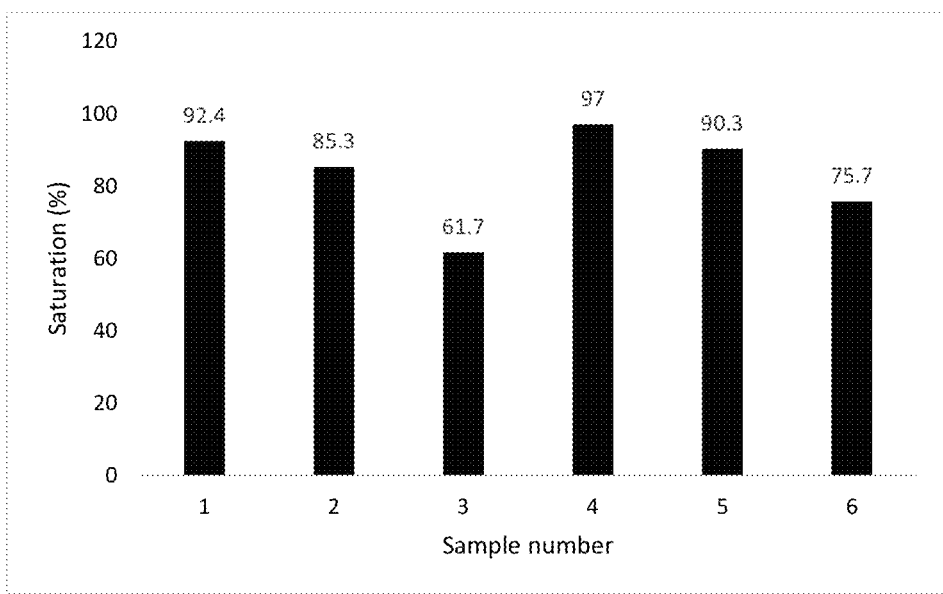
FIG. 6 shows the graph of the results of percentage of saturation for the samples of Example 2.
Figure 7:
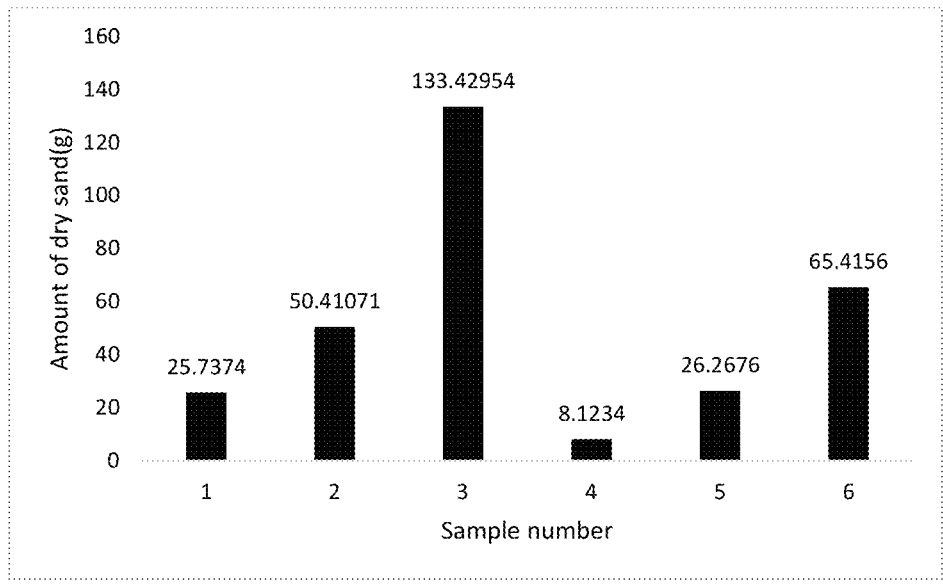
FIG. 7 shows the graph of the results of amount of dry sand after absorption for the samples of Example 2.
Figure 8:
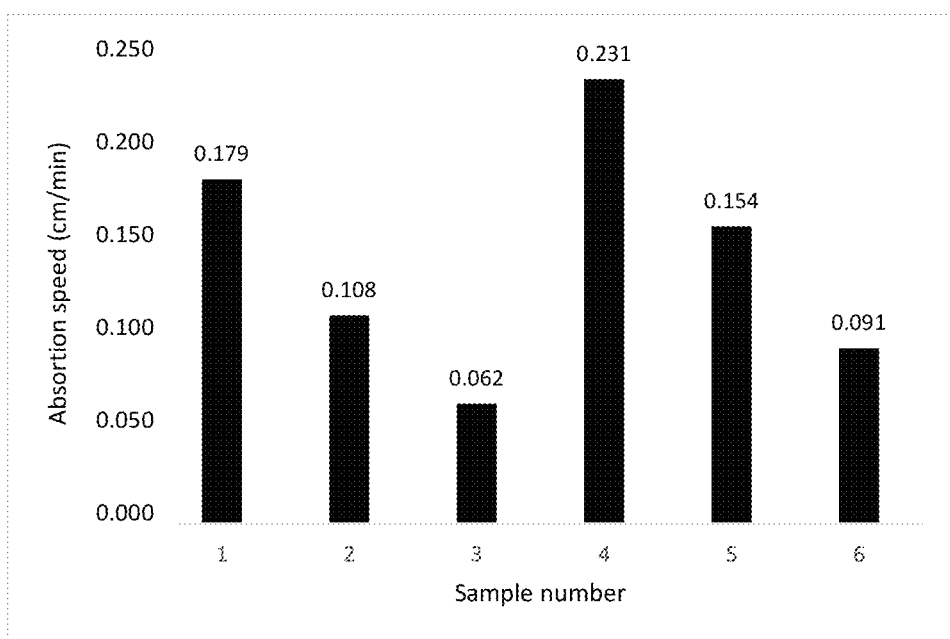
FIG. 8 portrays the graph of the results of absorption speed of the samples of Example 2.
Figure 9:
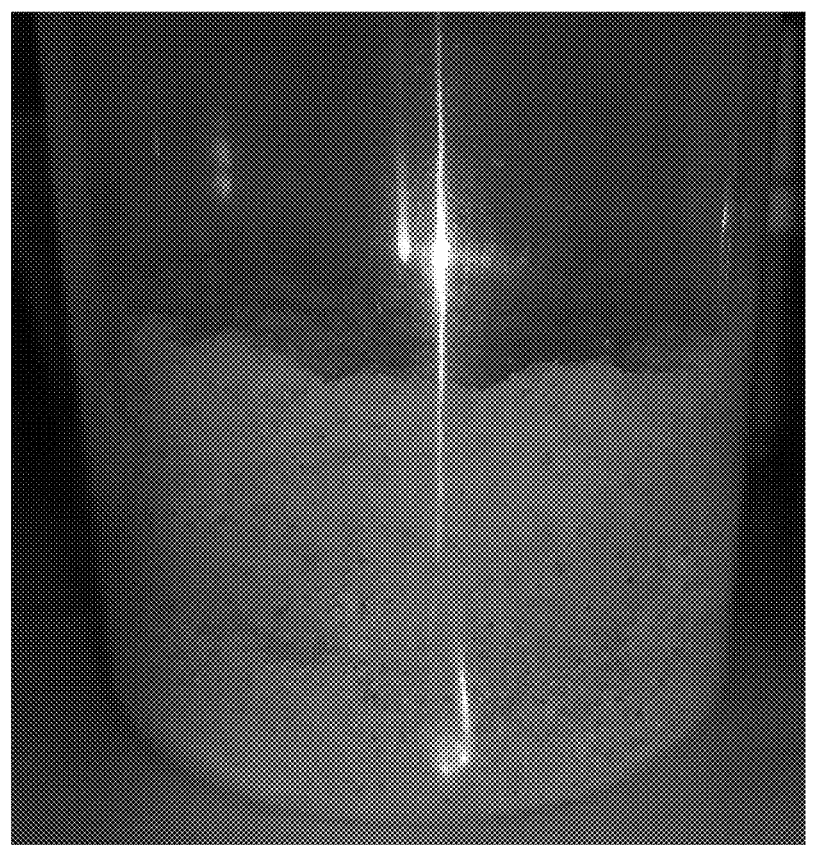
FIG. 9 presents an image of the results of absorption of sample 1 in Example 2.
Figure 10:
FIG. 10 displays an image of the results of absorption of sample 2 in Example 2.
Figure 11:
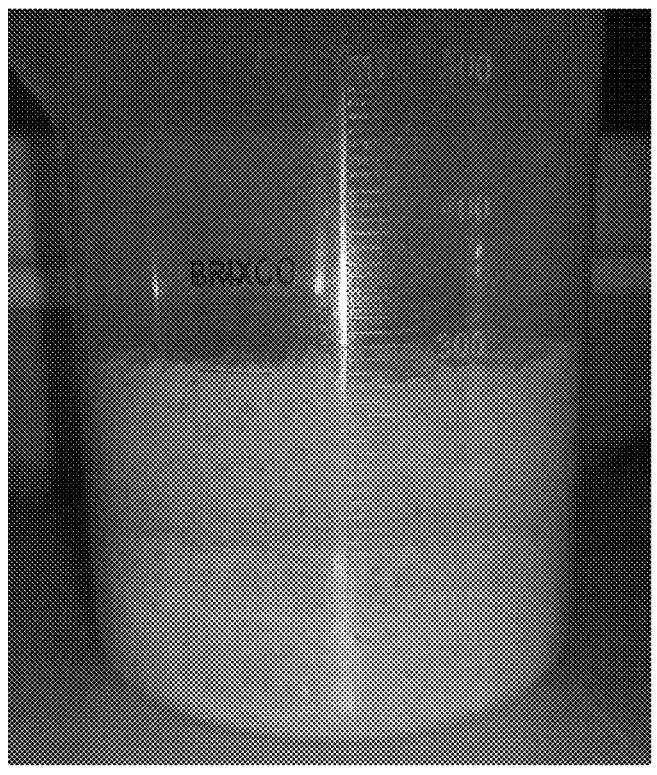
FIG. 11 showcases an image of the results of absorption of sample 3 in Example 2.
Figure 12:
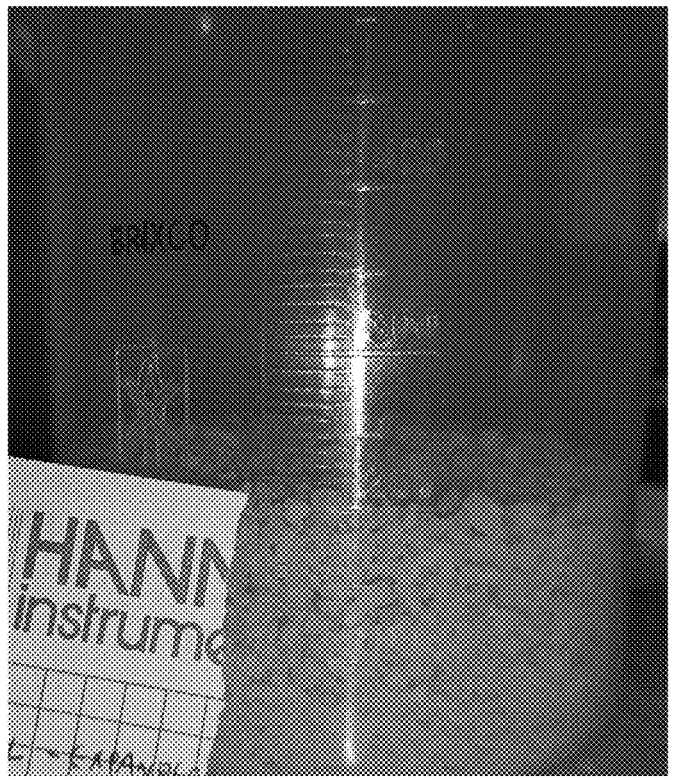
FIG. 12 exhibits an image of the results of absorption of sample 4 in Example 2.
Figure 13:
FIG. 13 features an image of the results of absorption of samples 5 and 6, respectively, in Example 2.

Average Height: This is the height from the edge of the litter present in the container to the bottom. The edge of the litter (200 ml in the beaker) is 0 cm (1), and the bottom of the beaker is the maximum height (5 cm) (2). In this case, the height (3) was measured up to where the average layer of wet litter reached, as shown in FIG. 3.

Penetration Time: It is the time elapsed between the start of water application to the sample and the completion of absorption to the saturation point. It was measured in minutes.

Saturation: This is the point where the sample does not absorb (receive) more added water; it does not necessarily represent its full absorption capacity. It is calculated by the following formula and presented as a percentage.

Saturation=(Wet Litter Quantity of the Sample)/(Final Weight of the Sample)

Absorption speed: This is the speed at which all added water is absorbed until reaching the saturation point. It is calculated using the following formula, and a higher number indicates a faster absorption process. It was measured in cm/min.

Absorption speed=(Average height)/(Penetration time)

The results that were obtained are presented in Table 6 below. Likewise, the results can be observed in the graphs of FIGS. 4 to 8.

TABLE 6

| Results of the processed samples for Example 2 | | | | | | |
|---|---|---|---|---|---|---|
| Variable/ Sample # | 1 | 2 | 3 | 4 | 5 | 6 |
| Initial weight of 200 ml sample in g | 178.3 | 187.8 | 203.2 | 102.6 | 108.5 | 117.1 |
| Amount of absorbed water in g | 160.3 | 155.1 | 145.2 | 168.18 | 162.3 | 152.1 |
| Amount of wet sand in g | 312.9 | 292.5 | 215 | 262.7 | 244.5 | 203.8 |
| Final total sand weight in g | 338.7 | 342.9 | 348.4 | 270.8 | 270.8 | 269.2 |
| % of saturation | 92.4 | 85.3 | 61.7 | 97 | 90.3 | 75.7 |
| Amount of dry sand in g | 25.74 | 50.41 | 133.4 | 8.123 | 26.27 | 65.42 |
| Average height in cm | 4.6 | 4.1 | 2.8 | 4.9 | 4.4 | 3.5 |
| Penetration time in min | 25.7 | 37.9 | 45.1 | 21.2 | 28.5 | 38.5 |
| Absorption speed | 0.179 | 0.108 | 0.062 | 0.231 | 0.154 | 0.091 |

The results of the absorption for each of the samples can be observed in FIGS. 9 to 13. It should be noted that in the presence of moisture, the sand expands (increasing its volume) due to the absorption it has undergone. Also, the final weight of the samples is greater than the initial weight because it includes the water absorbed during the tests.

From the tests, it was concluded that a higher percentage of sodium chloride (mineral salt) in the formulation results in denser sands, and a lower proportion of sodium chloride leads to less dense sands.

A lower proportion of salt in a sample corresponds to a higher absorption speed and a lower saturation percentage. This is the main conclusion of this test: salt causes impermeabilization in the sand, preventing the passage of fluids. In the appropriate proportion, this phenomenon is very desirable in these types of products for its functional purpose: it prevents liquids, such as cat bodily fluids, from reaching the bottom of the container (litter box), which is a major cause of unpleasant odors and inadequate clumping, as clumping is less prominent at the bottom of the container due to the sparse distribution of sand.

Therefore, with the obtained results, it was determined that the controlled addition of mineral salts in the claimed amounts in the cat litter generates the following conditions:

Enhances the litter's absorption capacity, different from the amount of absorbed water. This can be confirmed with the data and FIG. 7, which shows the amount of dry sand. It is evident that samples with a higher proportion of salt in their formulation had a greater amount of dry sand. The expander had a higher amount of dry sand compared to the extruder (samples 3 and 6, respectively), which had the same salt proportion. This allows litters with a higher salt proportion to absorb more water when handled correctly.

Significantly reduces the saturation percentage of the litter. This is related to the absorption capacity mentioned earlier because a saturated litter means it still has more fluid absorption capacity. However, an important factor comes into play, which is a common and desirable practice in litter cleaning: the frequent removal of wet upper layers to realize the absorption potential available in litters with a higher mineral salt proportion. This is related to absorption speed and the average height of wet layers concerning the impermeabilization generated by the mineral salt, as mentioned earlier.

In conclusion, the optimal proportion of mineral salt (sodium chloride as sea salt) in corn litter formulations resulted in improved litter absorption potential for both extruder-made and expander-made litters, being its main functional advantage in performance.

Example 3

For this test, the results of samples 3 and 8 from Example 1 were taken, as they are comparable and yielded the best results.

In two beakers, two samples of cat litter were added as follows: in beaker 1, 200 g of cat litter produced with the methodology of sample 3 from Example 1 were added, then 10 g of black water were added. In beaker 2, 200 g of cat litter produced with the methodology of sample 8 from Example 1 were added, then 10 g of black water were added.

The samples were stored in a dry place, away from sunlight, at room temperature, and locked. After 6 hours, the clumps were removed, and the results are presented in Table 7 below.

TABLE 7

| Results of the samples processed for Example 3. | | |
|---|---|---|
| | Corn - Extruder | Corn - Expander |
| Weight of removed clumps [g] | 21 | 27 |
| Applied Weight to Yield [g] | 200 g | 5000 g |
| Malleability | Very Malleable | Rigid, Not Malleable |
| Toughness | Low, breaks with hits | Very High, doesn't break with hits |
| Agglomeration Moisture [%] | 80% | 50% |
| Cold Water Solubilization Time [seconds] | 300 | 500 |
| Color | Changes to dark color | No color change |
| Odor | Fetid | Slightly fetid |

Figure 14:
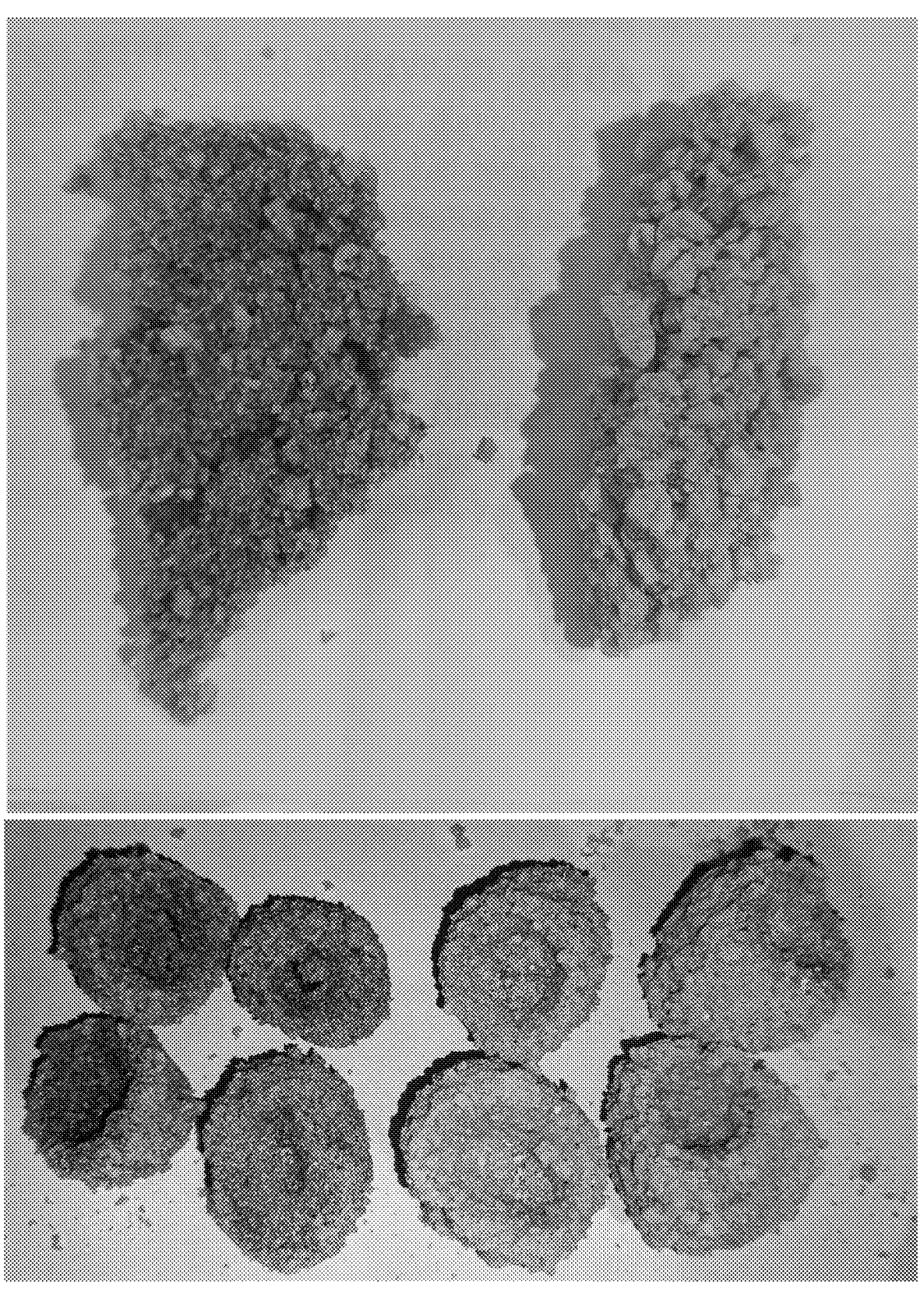
FIG. 14 provides a comparative image of sands treated with an extruder on the left and those treated with an expander on the right, for Example 3.

Regarding the weight of the removed clumps, a difference in weight between the clumps was evident. As shown in FIG. 14, the surface of the agglomeration treated with the extruder is wet and darkened, while the agglomeration treated with the expander is yellow and has dry particles throughout the outer layer (complete dehydration). This is an unexpected phenomenon, as the absence of wet material on the outer part provides technical advantages such as lower activity of aerobic bacteria, less exposure to the environment, a lower probability of adhering to the paws of cats, and less product adhering to the edges or bottom of the litter box.

Regarding the applied weight to yield, it was observed that the extruder-treated litter required 200 g of force for the agglomeration to start yielding, while the expander-treated litter required 5000 g of force to start yielding, meaning it is 25 times firmer. This unexpected advantage directly impacts the ease of collecting litter clumps with the scooper, as they do not break or crumble during handling. Similarly, when a clump forms at the bottom of the litter box, it can be removed in one piece. It is important to note that when a clump breaks into small pieces, it becomes a source of bad odor because the pieces are distributed among the remaining litter in the box.

Malleability, on the other hand, is defined as the ability of a material to yield or change its geometry under an external load. This property is highly correlated with the applied weight to yield mentioned earlier. This property is important because, during clump collection inside the litter box, it is unlikely that the user will accidentally break it into several small pieces, thus preventing these small residues from contaminating the rest of the litter.

Toughness can be defined as the ability of a material to resist strong impacts or blows without fracturing. In the case of cat litter, it is necessary for the clump not to fracture or break into small pieces to prevent the accumulation of residual bad odor in the litter box. In this test, it was found that the litter treated with the expander does not break with impacts despite being less malleable. On the other hand, the litter treated with the extruder easily breaks into small fragments.

Regarding moisture in the clump, the moisture content in each clump was evaluated using a solid moisture meter. The litter treated with the expander resulted in 50%, while the litter treated with the extruder resulted in 80%. This result is expected due to the clumping phenomenon of the litter treated with the expander, where it was evident that the litter was yellow and had dry particles throughout the outer layer. This is also very positive from an odor control perspective since there is less concentration of unpleasant odor factors, which is highly correlated with the color change. Also, to the touch, the clump of the litter treated with the extruder was wet and gummy, while that of the expander was not. This phenomenon was completely unexpected for the inventors of this application.

In the litter treated with the extruder, the solubilization time was 300 seconds, while in the litter treated with the expander, it was 500 seconds. The result is expected, considering that in the case of the extruder, there is already a much higher initial moisture than in the expander, which requires more time in the case of the litter treated with the expander to dissolve in cold water. In any case, this does not affect the performance of the cat litter but slightly slows down disposal in the toilet.

As for color, a significant difference was observed. In the case of the expander, there was no color change, while in the extruder, the clump turned dark, as can be seen in FIG. 14. This phenomenon was also an unexpected result for the inventors.

Regarding odor, the clump from the extruder did not totally inhibit foul odors. In the case of the expander, it not only completely inhibited foul odors but also emitted a pleasant minty lemon aroma, which was also a surprising result. For the odor test, the consensus of the same 5 people who participated in Test 1 was taken into account.

In conclusion, the hardness and toughness of the ball resulting from the clump of the extruder-treated litter are low, causing it to break easily, allowing small residues to remain in the litter box, generating a bad odor. Likewise, a change in color to a darker shade was evident, possibly due to starch degradation. Additionally, moisture on the surface of the ball was evident, which can increase bacterial activity due to incomplete dehydration (higher clump moisture).

In the case of the litter treated with the expander, contrary to what happens in the previous case, a clump in the form of a harder and more resistant ball was formed, allowing, when collecting with the scooper, no residues to fall into the litter box. It was also evident that there was no moisture on the surface of the ball and no color change over time.

Example 4

In this test, the performance of the two types of cat litter treated with the extruder and expander was evaluated under real conditions to test the findings of the previous examples.

The tests were carried out with 6 adult cats, 4 males, and 2 females, of common breed, healthy, with an average weight of 4.05 kg. For 15 days, the cats were observed and fed the same commercial adult cat food.

Three litter trays were placed in two rooms, each with a volume of approximately 13 m3 of sand, good ventilation, and natural lighting. In the first room, the trays contained corn-based cat litter treated with the expander and made according to the methodology indicated in sample 3 of example 1. On the other hand, in the second room, the trays contained corn-based cat litter treated with the extruder and made according to the methodology indicated in sample 8 of example 1. These formulations are equivalent.

Three cats were placed in each room for five consecutive days. During those days, in the afternoon, three volunteers performed olfactory readings of each room's environment, indicating on a scale from 0 to 5 how much the smell of feces or urine was perceived, with 0 being a very strong and unbearable odor, and 5 if there was no unpleasant odor. After the evaluation, the feces and urine (clumps) were removed from the litter boxes and refilled to a height of 6 cm of litter in each litter box.

Figure 15:
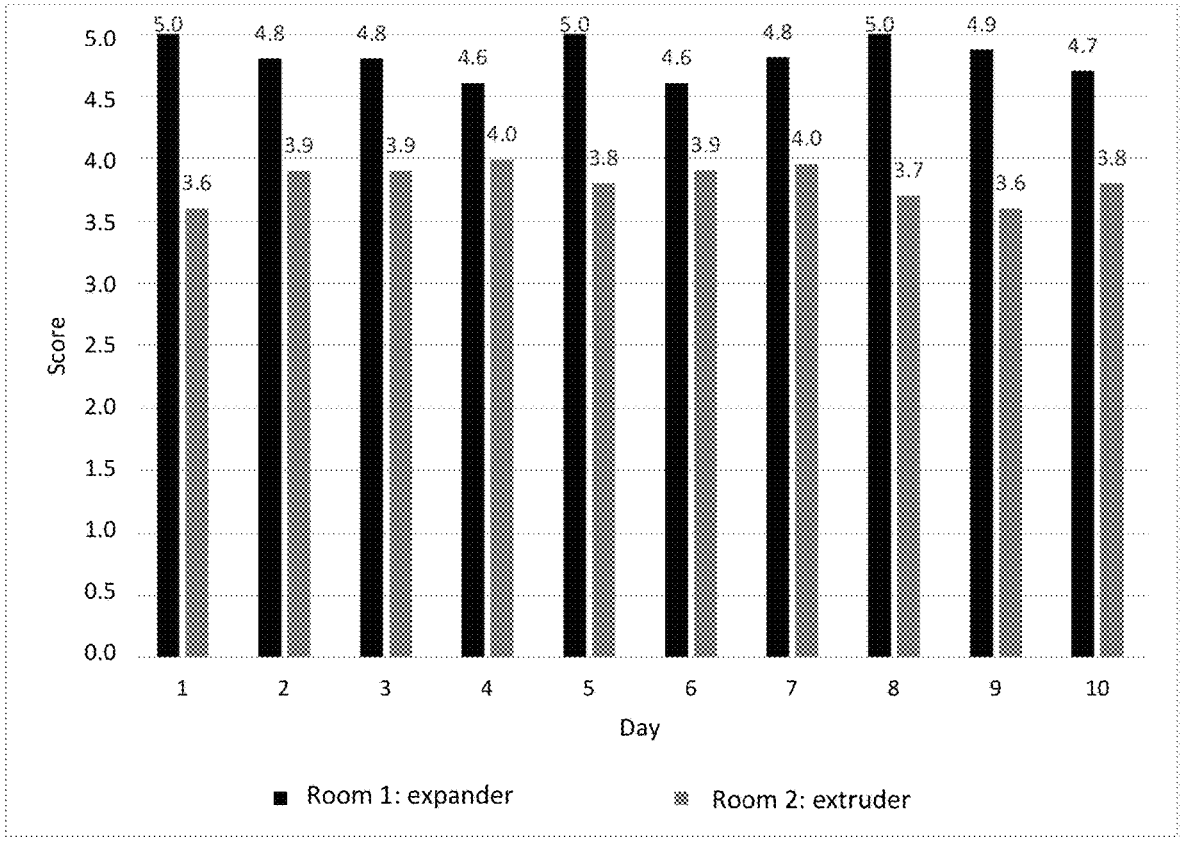
FIG. 15 illustrates the graph of the results of odor evaluation for the samples for Example 4.

The results obtained are shown in Table 7 below, and the graph of the results can be seen in FIG. 15.

TABLE 7

Results of the processed samples for Example 4.

| | Score | |
| --- | --- | --- |
| Day | Room 1: Expander | Room 2: Extruder |
| 1 | 5.0 | 3.6 |
| 2 | 4.8 | 3.9 |
| 3 | 4.8 | 3.9 |
| 4 | 4.6 | 4.0 |
| 5 | 5.0 | 3.8 |
| 6 | 4.6 | 3.9 |
| 7 | 4.8 | 4.0 |
| 8 | 5.0 | 3.7 |
| 9 | 4.9 | 3.6 |
| 10 | 4.7 | 3.8 |
| Mean | 4.8 | 3.8 |

In Table 8 below, the statistical results for Example 4 are presented.

TABLE 8

Statistical results of the samples processed for Example 4.

| Analysis of variance | | |
| --- | --- | --- |
| F Value | 1.185527561 | F value < Critical value |
| Critical value for F | 3.178893104 | |
| Conclusion: | There is no difference between the variance of the two groups. | |
| Two-sample t-test assuming equal variances | | |
| P(T <= t) two-tailed | 9.98172E−12 | p < alfa |
| Alpha value | 0.05 | |
| Conclusion | Significant difference in the mean | |

In the variance results for both samples, applying the Fisher's F-test with a confidence level of 95%, no statistically significant difference was found. This result is expected, as the test conditions in both rooms remained constant throughout the 10 days of evaluation. This result is also validated because there were no abnormal behaviors that would result in atypical dynamics in the odor inhibition of both litters.

Regarding the mean or average value, the t-student test for samples with similar variances was applied, and it was found that, with a confidence level of 95%, there is a significant difference in the mean value between both cat litters. This statistically validates that the odor inhibitory capacity of the litter processed by the expander is significantly different from that of the litter processed by the extruder. The mean value of the results from the sample processed with the expander is 4.8/5, while the sample processed with the extruder is 3.8/5. The litter processed by the expander has a statistically significantly superior odor inhibitory capacity.

The consensus among all evaluators is that the first room is an environment with a much better odor than the second.

The results experimentally validate that the corn-based cat litter, processed with the expander and the mixtures previously mentioned, represents an advancement compared to the state of the art in corn-based eco-friendly litters processed with the extruder.

Finally, in Table 9 below, some formulations of the sanitary sand of the present invention are shown, which have demonstrated the previously validated technical effects.

2. The sanitary sand composition according to claim 1, wherein the mineral salt is sodium chloride.

3. The sanitary sand composition according to claim 1, wherein the odor inhibitor is one or more essential oil.

4. A sanitary sand composition consisting of:
ground and expander treated whole corn in an amount between 77 to 97% w/w;
a mineral salt in an amount between 1 to 15% w/w;
a preservative in an amount between 0.0075 and 0.04% w/w;
an odor inhibitor in an amount between 0.075 and 1.25% w/w;
a fragrance in an amount between 0.3 and 0.6% w/w; and
one or more of a plant-based fiber, a micro-ingredient; a pH stabilizer, a dye; an acidity regulator, and an enzyme;
wherein the mineral salt is selected from the group consisting of sodium chloride and zinc chloride; and
wherein the preservative is selected from the group consisting of calcium propionate, sorbic acid, potassium sorbate, or a mixture thereof.

TABLE 9

Formulations of the sanitary sand of the present invention

| Component | 1 | 2 | 3 | 4 | 5 % w/w | 6 | 7 | 8 | 9 |
|---|---|---|---|---|---|---|---|---|---|
| Whole corn | 96.08% | 84.82% | 82.62% | 56.82% | 72.72% | 92.32% | 83.92% | 88.82% | 62.82% |
| Micronized sea salt | 3.75% | 3.00% | 0.00% | 1.00% | 2.00% | 2.50% | 5.00% | 1.00% | 2.00% |
| Coarse sea salt | 0.00% | 10.00% | 0.00% | 15.00% | 0.00% | 0.00% | 0.00% | 0.00% | 0.00% |
| Calcium propionate | 0.01% | 0.01% | 0.01% | 0.01% | 0.01% | 0.01% | 0.01% | 0.01% | 0.01% |
| Sorbic acid | 0.01% | 0.01% | 0.01% | 0.01% | 0.01% | 0.01% | 0.01% | 0.01% | 0.01% |
| Potassium sorbate | 0.01% | 0.01% | 0.01% | 0.01% | 0.01% | 0.01% | 0.01% | 0.01% | 0.01% |
| Calcium carbonate | 0.00% | 0.00% | 15.00% | 0.00% | 5.00% | 0.00% | 0.00% | 0.00% | 0.00% |
| Citric acid | 0.00% | 0.00% | 0.10% | 0.00% | 0.00% | 5.00% | 0.00% | 0.00% | 0.00% |
| Chlorine dioxide | 0.00% | 0.00% | 1.00% | 0.00% | 0.00% | 0.00% | 0.00% | 0.00% | 0.00% |
| *Yucca schirigera* | 0.00% | 0.00% | 0.10% | 0.00% | 0.10% | 0.00% | 0.00% | 0.00% | 0.00% |
| Sodium percarbonate | 0.00% | 0.00% | 0.00% | 1.00% | 0.00% | 0.00% | 0.00% | 0.00% | 0.00% |
| Silicon dioxide | 0.00% | 0.00% | 0.00% | 3.00% | 0.00% | 0.00% | 0.00% | 0.00% | 0.00% |
| Glycerin | 0.00% | 0.00% | 0.00% | 1.00% | 0.00% | 0.00% | 0.00% | 0.00% | 0.00% |
| Mineral oil | 0.00% | 0.00% | 1.00% | 1.00% | 0.00% | 0.00% | 0.00% | 0.00% | 0.00% |
| Activated oxygen | 0.00% | 0.00% | 0.00% | 1.00% | 0.00% | 0.00% | 0.00% | 0.00% | 0.00% |
| Corn flour | 0.00% | 0.00% | 0.00% | 0.00% | 0.00% | 0.00% | 0.00% | 0.00% | 10.00% |
| Rice flour | 0.00% | 0.00% | 0.00% | 0.00% | 0.00% | 0.00% | 0.00% | 0.00% | 15.00% |
| Rice hulls | 0.00% | 2.00% | 0.00% | 0.00% | 0.00% | 0.00% | 0.00% | 0.00% | 10.00% |
| Corn bran | 0.00% | 0.00% | 0.00% | 0.00% | 0.00% | 0.00% | 0.00% | 10.00% | 0.00% |
| Rice bran | 0.00% | 0.00% | 0.00% | 0.00% | 0.00% | 0.00% | 10.00% | 0.00% | 0.00% |
| Wheat bran | 0.00% | 0.00% | 0.00% | 0.00% | 20.00% | 0.00% | 0.00% | 0.00% | 0.00% |
| Yucca bran | 0.00% | 0.00% | 0.00% | 20.00% | 0.00% | 0.00% | 0.00% | 0.00% | 0.00% |
| Odor inhibitor (essential oil blend) | 0.10% | 0.10% | 0.10% | 0.10% | 0.10% | 0.10% | 1.00% | 0.10% | 0.10% |
| Lemon-mint fragrance | 0.05% | 0.05% | 0.05% | 0.05% | 0.05% | 0.05% | 0.05% | 0.05% | 0.05% |
| | 100% | 100% | 100% | 100% | 100% | 100% | 100% | 100% | 100% |

The invention claimed is:

1. A sanitary sand composition consisting of:
ground and expander treated whole corn in an amount between 77 to 97% w/w;
a mineral salt in an amount between 1 to 15% w/w;
a preservative in an amount between 0.0075 and 0.04% w/w;
an odor inhibitor in an amount between 0.075 and 1.25% w/w;
a fragrance in an amount between 0.3 and 0.6% w/w; and
wherein the mineral salt is selected from the group consisting of sodium chloride and zinc chloride; and
wherein the preservative is selected from the group consisting of calcium propionate, sorbic acid, potassium sorbate, or a mixture thereof.

5. The sanitary sand composition according to claim 4, wherein the plant-based fiber is in an amount between 2 to 20% w/w.

6. The sanitary sand composition according to claim 5, wherein the plant-based fiber is selected from the group consisting of rice hulls, corn bran, rice bran, wheat bran, *Yucca bran*, and *Yucca schidigera*, or a mixture thereof.

7. The sanitary sand composition according to claim 4, wherein the micro-ingredient is in an amount between 0.075 and 6.25% w/w.

8. The sanitary sand composition according to claim 7, wherein the micro-ingredient is selected from the group consisting of citric acid, chlorine dioxide, sodium percarbonate, silicon dioxide, glycerin, mineral oil, activated oxygen, and a mixture thereof.

9. The sanitary sand composition according to claim 4, wherein the pH stabilizer is in a proportion between 4 and 18% w/w.

10. The sanitary sand composition according to claim 9, wherein the pH stabilizer is selected from the group consisting of calcium carbonate, sodium bicarbonate, and potassium hydroxide.

11. The sanitary sand composition according to claim 4, wherein the dye is in a proportion between 0.001 and 0.05% w/w.

12. The sanitary sand composition according to claim 4, wherein the acidity regulator is in a proportion of 0.05 to 3% w/w.

13. The sanitary sand composition according to claim 12, wherein the acidity regulator is silicon dioxide.

14. The sanitary sand composition according to claim 4, wherein the enzyme is selected from the group consisting of amylase, protease, and lipase, in a proportion between 0.01 to 0.1% w/w.

15. A sanitary sand composition consisting of:

ground and expander treated whole corn in an amount between 77 to 97% w/w;

a mineral salt in an amount between 1 to 15% w/w;

a preservative in an amount between 0.0075 and 0.04% w/w;

an odor inhibitor in an amount between 0.075 and 1.25% w/w;

a fragrance in an amount between 0.3 and 0.6% w/w; and one or more of a plant-based fiber, a micro-ingredient; a pH stabilizer, a dye; an acidity regulator, and an enzyme;

wherein the plant-based fiber is selected from the group consisting of rice hulls, rice bran, wheat bran, *Yucca bran, Yucca schidigera*, or a mixture thereof, wherein the enzyme is selected from the group consisting of amylase, lipase, and any combination thereof.

* * * * *